(12) United States Patent
Tao et al.

(10) Patent No.: US 11,698,811 B1
(45) Date of Patent: Jul. 11, 2023

(54) MACHINE LEARNING-BASED SYSTEMS AND METHODS FOR PREDICTING A DIGITAL ACTIVITY AND AUTOMATICALLY EXECUTING DIGITAL ACTIVITY-ACCELERATING ACTIONS

(71) Applicant: Trusli Inc., Middletown, DE (US)

(72) Inventors: Meng Tao, San Francisco, CA (US); Yi Qiao, Saratoga, CA (US); Ali Alsalman, San Jose, CA (US)

(73) Assignee: Trusli Inc., Middleton, DE (US)

( * ) Notice: Subject to any disclaimer, the term of this patent is extended or adjusted under 35 U.S.C. 154(b) by 0 days.

(21) Appl. No.: 17/889,355

(22) Filed: Aug. 16, 2022

Related U.S. Application Data

(60) Provisional application No. 63/325,602, filed on Mar. 30, 2022.

(51) Int. Cl.
*G06F 9/455* (2018.01)
*G06F 9/48* (2006.01)
*G06F 11/34* (2006.01)

(52) U.S. Cl.
CPC ........ *G06F 9/4881* (2013.01); *G06F 11/3438* (2013.01)

(58) Field of Classification Search
CPC .......................... G06F 9/4881; G06F 11/3438
See application file for complete search history.

(56) References Cited

U.S. PATENT DOCUMENTS

| 11,354,500 B2* | 6/2022 | Bhattacharya | G06F 40/205 |
| 2005/0192992 A1* | 9/2005 | Reed | G06Q 10/107 |
| 2020/0218585 A1* | 7/2020 | Dotan-Cohen | G06F 40/44 |

* cited by examiner

*Primary Examiner* — Wissam Rashid
(74) *Attorney, Agent, or Firm* — Padowithz Alce; Quintin Scheitlin; Alce PLLC

(57) ABSTRACT

A method for machine learning-informed surfacing and automated execution of digital activity-accelerating actions includes identifying a target digital artifact; and based on identifying the target digital artifact: searching a digital activity-accelerator registry based on the target digital artifact; and in accordance with a determination that the digital activity-accelerator registry includes a composite activity sequence corresponding to the target digital artifact, displaying, via a graphical user interface, one or more selectable representations of one or more tasks included in the composite activity sequence.

15 Claims, 3 Drawing Sheets

200

Constructing a Digital Activity-Accelerator Registry
S210

Computing Activity-Accelerating Inferences for a Target User Artifact
S220

Identifying Activity-Accelerating Actions Germane to the Target User Artifact
S230

Executing One or More of the Identified Activity-Accelerating Actions
S240

200

Constructing a Digital Activity-Accelerator Registry
S210

Computing Activity-Accelerating Inferences for a Target User Artifact
S220

Identifying Activity-Accelerating Actions Germane to the Target User Artifact
S230

Executing One or More of the Identified Activity-Accelerating Actions
S240

FIGURE 2

MACHINE LEARNING-BASED SYSTEMS AND METHODS FOR PREDICTING A DIGITAL ACTIVITY AND AUTOMATICALLY EXECUTING DIGITAL ACTIVITY-ACCELERATING ACTIONS

CROSS-REFERENCE TO RELATED APPLICATIONS

This application claims the benefit of U.S. Provisional Application No. 63/325,602, filed on 30 Mar. 2022, which is incorporated in its entirety by this reference.

TECHNICAL FIELD

This invention relates generally to the computer-aided task automation field, and more specifically, to new and useful systems and methods for intelligently identifying and automatically executing activity-accelerating actions that may be associated with a digital artifact.

BACKGROUND

More and more businesses are providing their workforce with access to electronic messaging applications. Some of the digital messages included in these electronic messaging applications may relate to activities/tasks that need to be performed in various other computed-based applications. Since these electronic messaging applications and the various other computed-based applications often operate in a disjoined manner, it is left to the user to determine which activities/tasks are related to a target electronic message and, in turn, manually perform such activities/tasks at the various other computed-based applications.

This analysis may be burdensome to the user and prone to human error, especially when there are numerous tasks and/or complex tasks associated with an electronic message. Thus, there is a need for new and useful systems and methods for automatically identifying activities/tasks that may be associated with an electronic message and enabling automatic execution of such activities/tasks.

The embodiments of the present application described herein provide technical solutions that address, at least, the needs described above.

BRIEF SUMMARY OF THE INVENTION(S)

In some embodiments, a method for machine learning-informed surfacing and automated execution of digital activity-accelerating actions includes: constructing a digital activity-accelerator registry that includes a plurality of composite activity sequences, wherein each of the plurality of composite activity sequences relates to a distinct collection of interdependent computer-executable tasks; identifying a target digital artifact; and based on identifying the target digital artifact: computing, via an ensemble of machine learning models, a plurality of activity-accelerating inferences for the target digital artifact, including: (1) a first activity-accelerating inference that relates to an estimated intent of the target digital artifact, (2) a second activity-accelerating inference that relates to an estimated domain of an activity associated with the target digital artifact, and (3) a third activity-accelerating inference that relates to an estimated sub-domain of the activity associated with the target digital artifact; searching the digital activity-accelerator registry based on the plurality of activity-accelerating inferences, wherein searching the digital activity-accelerator registry includes: constructing a composite activity sequence search query that comprises a plurality of search parameters, wherein the plurality of search parameters includes: (A) a first search parameter that causes the search query, when executed, to search for composite activity sequences in the digital activity-accelerator registry that include a computer-executable task relating to the estimated intent of the target digital artifact, (B) a second search parameter that causes the search query, when executed, to search for composite activity sequences in the digital activity-accelerator registry that relate to the estimated domain of the activity associated with the target digital artifact, and (C) a third search parameter that causes the search query, when executed, to search for composite activity sequences in the digital activity-accelerator registry that relate to the estimated sub-domain of the activity associated with the target user artifact; and executing the composite activity sequence search query, wherein executing the composite activity sequence causes one or more target composite activity sequences to be returned from the digital activity-accelerator registry if the one or more target composite activity sequences satisfy the plurality of search parameters; extracting at least a subset of the computer-executable tasks included in the one or more target composite activity sequences based on one or more pre-defined action-surfacing criteria; and displaying, via a graphical user interface, a digital representation corresponding to each computer-executable task included in the subset, wherein each digital representation displayed in the graphical user interface is selectable and, when selected, causes a corresponding activity-accelerating task to be automatically executed by one or more computers.

In some embodiments, constructing the digital activity-accelerator registry includes automatically creating, by the one or more computers, the plurality of composite activity sequences.

In some embodiments, automatically creating the plurality of composite activity sequences includes: collecting digital activity data relating to one or more users over a respective period of time, grouping the digital activity data into one or more sets of interdependent computer-executable tasks, instantiating a composite activity sequence corresponding to each of the one or more sets of interdependent computer-executable tasks, and embedding each instantiated composite activity sequence in the digital activity-accelerator registry.

In some embodiments, the digital activity data includes a first plurality of computer-executable tasks, and grouping the digital activity data into the one or more sets of interdependent computer-executable tasks includes: in accordance with a determination that the one or more users performed the first plurality of computer-executable tasks in a same order for more than a threshold number of times, grouping the first plurality of computer-executable tasks as a first set of interdependent computer-executable tasks; and in accordance with a determination that the one or more users did not perform the first plurality of computer-executable tasks in a same order for more than the threshold number of times, forgoing grouping the first plurality of computer-executable tasks.

In some embodiments, the digital activity-accelerator registry includes (1) a plurality of composite activity sequences automatically derived by the one or more computers and (2) a plurality of user-created composite activity sequences.

In some embodiments, the one or more target composite activity sequences returned from executing the composite activity sequence search query includes a first target composite activity sequence, and extracting the subset of computer-executable tasks from the first target composite activity sequence includes: (1) extracting, from the first target composite activity sequence, a first computer-executable task corresponding to the estimated intent of the target digital artifact, and (2) extracting, from the first target composite activity sequence, one or more second computer-executable tasks ordered after the computer-executable task corresponding to the estimated intent of the target digital artifact.

In some embodiments, computer-executable tasks ordered before the first computer-executable task are not extracted from the first target composite activity sequence.

In some embodiments, the one or more target composite activity sequences satisfy the plurality of search parameters if: (1) the one or more target composite activity sequences include a computer-executable task relating to the estimated intent of the target digital artifact, (2) the one or more target composite activity sequences relate to the estimated domain of the activity associated with the target digital artifact, and (3) the one or more target composite activity sequences relate to the estimated sub-domain of the activity associated with the target digital artifact.

In some embodiments, the method is performed at a computer-aided task automation service, and the target digital artifact comprises a digital email message.

In some embodiments, the target digital artifact is identified within a threshold amount of time of a digital messaging application sending the digital email message.

In some embodiments, the target digital artifact is identified within a threshold amount of time of a digital messaging application receiving the digital email message.

In some embodiments, displaying the graphical user interface includes displaying the digital representation corresponding to each computer-executable task included in the subset concurrently with a digital representation of the target digital artifact.

In some embodiments, the graphical user interface includes a first digital representation corresponding to a first computer-executable task. In some embodiments, the method includes receiving an input selecting the first digital representation; and based on receiving the input: searching a lookup table that correlates computer-executable tasks to document templates; and in accordance with a determination that the lookup table includes an entry corresponding to the first computer-executable task, automatically generating one or more user-specific documents.

In some embodiments, the method includes in accordance with a determination that the lookup table does not include the entry corresponding to the first computer-executable task, forgoing automatically generating one or more user-specific documents.

In some embodiments, automatically generating one or more user-specific documents includes: identifying, based on the entry corresponding to the first computer-executable task, a plurality of document templates corresponding to the first computer-executable task; instantiating, based on the plurality of document templates, a plurality of user-specific documents; extracting, via an entity extraction machine learning model, a plurality of named entities from the target digital artifact; and installing, at corresponding portions in the plurality of user-specific documents, one or more of the plurality of named entities.

In some embodiments, a method for machine learning-informed surfacing and automated execution of digital activity-accelerating actions includes: identifying a target digital artifact; and based on identifying the target digital artifact: searching a digital activity-accelerator registry based on the target digital artifact; and in accordance with a determination that the digital activity-accelerator registry includes a composite activity sequence corresponding to the target digital artifact, displaying, via a graphical user interface, one or more selectable representations of one or more tasks included in the composite activity sequence.

In some embodiments, the method includes in accordance with a determination that the digital activity-accelerator registry does not include a composite activity sequence corresponding to the target digital artifact, forgoing displaying the one or more selectable representations.

In some embodiments, displaying the graphical user interface includes displaying a first representation corresponding to the target digital artifact, and the target digital artifact is identified when an input selecting the first representation is received.

In some embodiments, the method includes receiving a second input selecting a second representation corresponding to a second digital artifact; and based on receiving the second input: forgoing displaying the one or more selectable representations of the one or more tasks included in the composite activity sequence; searching the digital activity-accelerator registry based on the second digital artifact; and in accordance with a determination that the digital activity-accelerator registry includes a second composite activity sequence corresponding to the second digital artifact, displaying, via a graphical user interface, one or more selectable representations of one or more tasks included in the second composite activity sequence.

In some embodiments, the target digital artifact comprises a digital email message.

BRIEF DESCRIPTION OF THE FIGURES

FIG. 2 illustrates an example method 200 in accordance with one or more embodiments of the present application.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

Figure 1:
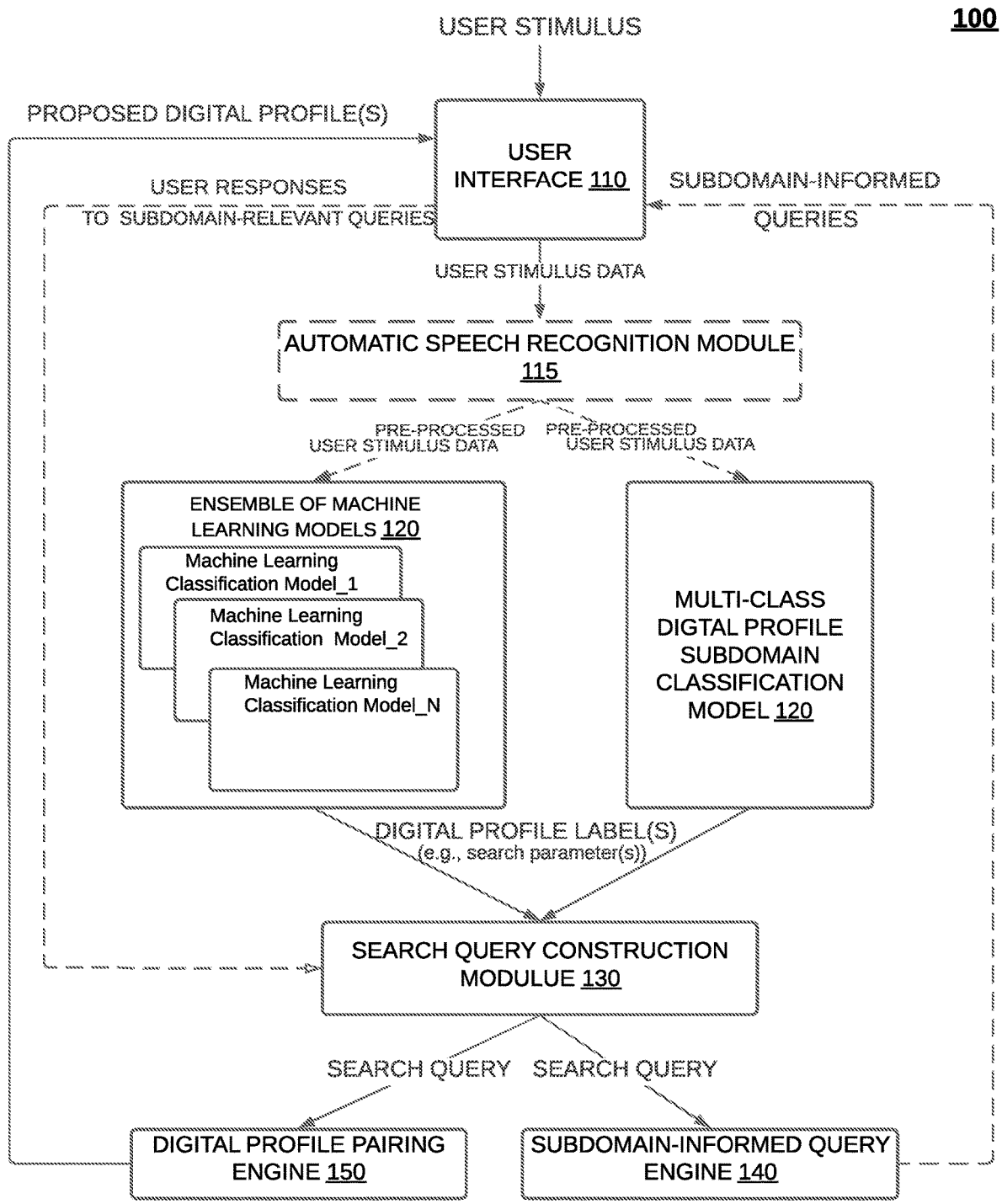
FIG. 1 illustrates a schematic representation of a system 100 in accordance with one or more embodiments of the present application.

1. System for Machine Learning-Based Pairing of User Stimuli-to-Activity-Accelerating Actions As shown in FIG. 1, a system 100 for machine learning-based pairing of user stimuli-to-digital profiles and/or pairing of user stimuli-to-activity-accelerating actions may include a user interface 110, a machine learning-based classification and inference system 120, a search query construction module 130, a subdomain-informed query engine 140, and a digital profile pairing engine 150. The system 100 may optionally include an automatic speech recognition module 115. The system 100 may sometimes be referred to herein as a service provider discovery service 100, a user content-to-digital account pairing service 100, or an online digital profile discovery service 100. As described in more detail in U.S. patent Ser. No. 17/687,229, which is incorporated in its entirety by this reference, the service provider discovery service 100 may enable a discovery of any suitable online digital profile data and/or related online digital profile content for a plurality of distinct service provider digital profiles including, but not limited to, lawyer-service provider profiles, health care-service provider profiles, financial services-service provider profiles, insurance services-service provider profile, and/or the like.

In one or more embodiments, each module or engine of the system 100 may be implemented by one or more computing servers, one or more computing processors, or computing servers of a distributed computing system.

1.1 User Interface

In one or more embodiments, the system or service 100 may function to implement a user interface 110 that may preferably function to identify, collect, or ingest user input in any form. The user interface 110 may comprise a search interface that may be digitally accessible to online users over a computing medium, such as the world wide web or the internet. Additionally, or alternatively, in some embodiments, the user interface 110 may comprise one or more selectable user interface elements that, when selected, cause the system 100 to automatically perform one or more activity-accelerating actions (as described in more detail in method 200).

In one or more embodiments, the online users that may be interacting with the user interface 110 may input a user query in the form of text input, utterance input, and/or image input, and the user interface 110 may function to identify, collect, or ingest the user query.

In one or more embodiments, the user interface 110 may be implemented via any suitable computing device and/or from including, but not limited to, a mobile computing device, a personal computing device, a web-browser (having a website displayed therein), or the like. In some embodiments, the user interface 110 may function to implement one or more graphical user interface objects that may enable online users to continuously or periodically interact with the system 100 via the user interface 110. For instance, the user interface 110 may function to implement one or more text input fields into which online users may freely (e.g., manually) enter a user query (e.g., a user stimulus, a user input, or the like). In one or more embodiments, the user interface 100 may be enabled by a client application operating on a mobile computing device or the like. In such embodiments, the client application may be in operable communication with a client server of the system 100.

In one or more embodiments, based on identifying input of the user query at the user interface 110 (e.g., an Internet-accessible user interface), the user query data associated with the user query may be routed to a machine learning-based classification system and, in some embodiments, the user query data may be optionally routed to an automatic speech recognition module 115 that may convert the user query to text before routing the user query data to the machine learning-based classification system, if needed.

1.2 Machine Learning-Based Inference System|Machine Learning-Based Digital Profile Subdomain Inference System In one or more embodiments, the system 100 may function to implement a machine learning-based digital profile inference system 120 that may preferably function to generate inferences (e.g., classification inferences, including classification labels, entity or slot extraction inferences, and/or the like) (or classify) a target piece of user stimulus data (e.g., pre-processed user stimulus data) into one or more digital profile subdomain categories. Additionally, or alternatively, the inference system 120 may preferably function to generate activity-accelerating inferences for a target digital artifact (e.g., a digital message) (as described in more detail in method 200).

The machine learning-based digital profile inference system 120, which may be sometimes referred to herein as a machine learning-based digital profile classification system 120 may be trained for interpreting the user query (e.g., human text), extracting features from the user query, and/or computing digital profile subdomain classification predictions based on the extracted features.

In one or more embodiments, an algorithmic structure underlying the machine learning-based digital profile classification system 120 may be a multi-class digital profile subdomain classification model or an ensemble of digital profile classification models. In one or more embodiments, the multi-class digital profile subdomain classification model may be algorithmically configured and/or specifically trained to generate predictions and/or inferences across a plurality of distinct categories or classes of distinct digital profiles. Accordingly, in such embodiments, the multi-class classification model may function to search unique combination of distinct classes of profiles based on search query input data. The multi-class digital profile subdomain classification model or the ensemble of digital profile classification models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

In one or more embodiments, the classification inference(s) of the machine learning-based digital profile classification system 120 may function to label a target piece of user stimulus data into one or more digital profile subdomain categories that may be used, as input, to a downstream module (e.g., the search query construction module) or engine (e.g., the digital profile pairing engine, the subdomain-informed query engine).

1.3 Search Query Construction Module

In one or more embodiments, the system 100 may function to implement a search query construction module 130 that may preferably function to construct one or more search queries for a target piece of user stimulus data and/or function to construct one or more search queries for identifying activity-accelerating actions germane to a target digital artifact (as described in more detail in method 200). In one or more embodiments, the search query construction module may function to derive search parameters (for a target piece of user stimulus data) based on the machine learning-based classification label(s) or machine learning-based classification inference(s) predicted by the machine learning-based digital profile classification system 120. In one or more embodiments, the one or more search queries constructed by the search query construction module 130 may be in a machine-understandable format or syntax according to a prescribed search format or search syntax required by at least one of the digital profile pairing engine 150 or the subdomain-informed query engine 140.

In one or more embodiment, the search query construction module may function to construct a subdomain-informed search query that, when executed, may function to search a database comprising a corpus of subdomain-informed query data and match (or pair) the subdomain-informed search query to one or more subdomain-informed queries based on the search parameters of the subdomain-informed query. Additionally, or alternatively, in one or more embodiments, the search query construction module 130 may function to construct a digital profile search query (or digital account search query) that, when executed, may function to automatically search a database comprising a corpus of digital profile data and pair (or match) the digital profile search query to one or more digital profiles data sets (e.g., a plurality of service provider digital profiles, a plurality of digital accounts, or the like).

1.4 Subdomain-Informed Query Engine

In one or more embodiments, the system 100 may function to implement a subdomain-informed query engine 140 that may preferably function to selectively identify and pose one or more subdomain-informed queries to a target online user of the system or service 100. In one or more embodiments, the subdomain-informed query engine 140 may comprise a database comprising a corpus of subdomain-informed query data. In one or more embodiments, the corpus of subdomain-informed query data may be searched using the subdomain-informed search query (e.g., the search parameters of the subdomain-informed search query) constructed by the search query construction module 130. The corpus of subdomain-informed query data may include subdomain-informed queries indexed according to a corresponding digital profile subdomain classification label (e.g., the corpus of subdomain query data may include a plurality of distinct digital profile subdomain classification labels and a distinct set of subdomain-informed queries digitally mapped (or electronically linked) to each of the plurality of distinct digital profile subdomain classification labels).

In one or more embodiments, the subdomain-informed query engine 140 may function to selectively match or selectively pair a subset of subdomain-informed queries of the plurality of subdomain-informed queries of the corpus of subdomain-informed query data to a target subdomain-informed search query. Accordingly, in one or more embodiments, the subset of subdomain-informed query data may be posed to the target user via the user interface 110.

1.5 Digital Profile Pairing Engine

In one or more embodiments, the system 100 may function to implement a digital profile pairing engine 150 that may preferably function to selectively identify and display, via an Internet-accessible user interface 110, one or more digital profiles to a target online user of the system or service 100. In one or more embodiments, the digital profile pairing engine 150 may comprise a database comprising a corpus of digital profile data. In one or more embodiments, the corpus of digital profile data may be searched using the digital profile search query (e.g., the search parameters of the digital profile search query) constructed by the search query construction module 130. The corpus of digital profile data may include digital profiles or digital accounts indexed according to the one or more distinct digital profile subdomain classification labels (as described in more detail in U.S. patent Ser. No. 17/687,229).

In one or more embodiments, the digital profile pairing engine 150 may function to selectively match or selectively pair a subset of digital profiles (e.g., digital accounts) of the plurality of digital profiles (e.g., digital accounts) of the corpus of digital profile data to a target digital profile search query that may be displayed to a target user via the user interface 110.

It shall be noted that, in some examples, the system 100 may perform one or more of the processes described in method 200 with additional, fewer, or different components than the ones described above.

2. Machine Learning-Based Method for Intelligently Surfacing and Executing Digital Activity-Accelerating Actions As shown in FIG. 2, a machine learning-based method 200 for intelligently surfacing and executing digital activity-accelerating actions preferably includes constructing a digital activity-accelerator registry (S210), computing one or more activity-accelerating inferences for a target user artifact (S220), identifying activity-accelerating actions germane to the target user artifact (S230), and executing one or more of the identified activity-accelerating actions (S240).

2.10 Constructing a Digital Activity-Accelerator Registry

S210, which includes constructing a digital activity-accelerator registry, may function to instantiate a digital activity-accelerator registry that may be configured to store data relating to one or more composite activity sequences and/or may function to embed one or more additional composite activity sequences in the digital activity-accelerator registry preferably in association with one or more activity or domain classification labels. In some embodiments, each composite activity sequence embedded in the digital activity-accelerator registry may relate to a distinct objective or goal of a user and/or may comprise a collection of interdependent or cascading tasks/actions required for completing such objective or goal (e.g., computer-executable tasks/actions, user-performed tasks/actions, and/or the like). The digital activity-accelerator registry, in various embodiments, may include any suitable data structure including, but not limited to, a lookup table, a lookup matrix, and/or the like.

In some embodiments, S210 may function to construct the digital activity-accelerator registry for a target subscriber (e.g., a subscriber of system 100 or service implementing the method 200). Accordingly, in such embodiments and as will be described in more detail herein, when constructing the digital activity-accelerator registry for a target subscriber, S210 may function to embed, in the digital activity-accelerator registry, composite activity sequences that may be based on one or more users associated with the target subscriber (and, optionally, not based on users associated with other subscribers of the system 100).

System-Derived Composite Activity Sequences

In a first implementation, embedding the one or more composite activity sequences in the digital activity-accelerator registry may include embedding one or more system-derived composite activity sequences in the digital activity-accelerator registry (e.g., composite activity sequences derived without user input).

In some embodiments, automatically deriving one or more system-derived composite activity sequences may include collecting or obtaining digital activity data relating to digital activities of one or more users associated with a target subscriber. In one example of such embodiments, the digital activity data may be collected/sourced via an on-device software agent installed at one or more electronic devices of the one or more users and/or may be provided (e.g., uploaded) to the system 100 by a target subscriber. Furthermore, in some examples of such embodiments, the digital activity data sourced/collected by S210 may include data relating to applications used by the one or more users over one or more periods, data relating to user interfaces (e.g., application windows) accessed by the one or more users over the respective time period(s), data relating to operating system (OS) commands executed by the one or more users over the respective time period, data relating to user interface elements selected by the one or more users over the respective time period, data relating to text entered/edited at the one or more user interfaces over the respective time period, data relating to the URLs visited by the one or more users over the respective time period, data relating to an amount of time spent at a target user interface over the respective time period, data relating to computer activities performed contemporaneously with, before, and/or after executing a respective computer command, and/or the like.

Additionally, or alternatively, in some embodiments, automatically deriving one or more system-derived composite activity sequences may include identifying/recognizing one or more collections (e.g., sets) of interdependent activities or tasks from the sourced digital activity data. In a first implementation of such embodiments, S210 may function to recognize/detect one or more sets of interdependent activities or tasks based on pre-defined rules or heuristics. For instance, in a non-limiting example, S210 may function to automatically determine that a first set of activities/tasks included in the sourced digital activity data are interdependent based on S210 detecting that more than a threshold number of users executed the first set of activities/tasks in a same (or similar) sequence/order. Similarly, in another non-limiting example, S210 may function to automatically determine that a second set of activities/tasks included in the sourced digital activity data are interdependent based on S210 detecting that a user performed the second set of activities/tasks in a same (or similar) sequence for more than a threshold number of times.

Accordingly, in or more embodiments, S210 may function to perform a pairwise analysis of a first corpus of digital activity data of a first user and a second corpus of digital activity data of a second user to identify common sets of tasks or activities being executed or performed in a similar sequence. In such embodiments, S210 may function to extract features of the common sets of tasks from the corpora of digital activity data to derive one or more composite activity sequences.

It shall be recognized that, in some embodiments, S210 may function detect interdependent activities/tasks based on a combination of heuristics and/or based on other heuristics without departing from the inventions contemplated herein.

Additionally, or alternatively, in some embodiments, automatically deriving one or more system-derived composite activity sequences may include constructing a composite user activity sequence for each collection or set of interdependent activities/tasks identified by S210. In one example of such embodiments, to construct a composite activity sequence for an identified collection or set of interdependent activities/tasks, S210 may function to instantiate a new composite activity sequence data structure and add, to the instantiated data structure, each activity/task included in the identified set of interdependent activities/tasks.

Furthermore, in some examples, constructing a system-derived composite activity sequence for a target set of interdependent computer-executable activities/tasks may include ordering each activity/task added to the instantiated data structure. It shall be noted that, in some embodiments, the order specified/indicated in the composite activity sequence data structure may be equivalent to (or different from) the order/sequence in which the activities/tasks were originally executed by the one or more users (as mentioned above).

Surfacing the System-Derived Composite Activity Sequences

In some embodiments, S210 may function to surface one or more of the system-derived composite activity sequences to a user for review, input, and/or validation. In one example of such embodiments, surfacing one or more of the system-derived composite activity sequences may include displaying graphical representations of the system-derived composite activity sequences at user interfaces provided by the system 100. It shall be noted that, in some examples, graphically displaying a system-derived composite activity sequence to a user may enable the user to easily review the system-derived composite activity sequence and, in turn, modify and/or add the system-derived composite activity sequence to the digital activity-accelerator registry.

In some embodiments, while S210 is surfacing one or more of the system-derived composite activity sequences to the user, S210 may additionally function to receive user input for assigning a label/name to each (or at least one) of the system-derived composite activity sequences, user input for assigning a practice area to each of (or at least one) of the system-derived composite activity sequences, and/or user input for assigning a sub-practice area to each of (or at least one) of the system-derived composite activity sequences.

For instance, in a non-limiting example, based on a user review of a system-derived composite activity sequence, S210 may function to receive user input for indicating that the system-derived composite activity sequence includes activities/tasks related to intaking a new client in a criminal practice area (or other practice area), related to requesting medical records in a personal injury practice area, related to requesting financial records in a corporate practice area, and/or the like.

Furthermore, in some embodiments, while S210 is surfacing a system-derived composite activity sequence to the user, S210 may function to receive one or more user inputs for assigning a label/name to each (or at least one) of the activities/tasks underpinning the system-derived composite activity sequence and/or receive user inputs for modifying an order of the activities/tasks underpinning the system-derived composite activity. Additionally, or alternatively, in some embodiments, the received user inputs may relate to inputs for adding additional activities/tasks to the system-derived composite activity sequence, removing activities/tasks to the system-derived composite activity sequence, and/or the like.

For instance, in a non-limiting example, based on a user review of a system-derived composite activity sequence, S210 may function to receive an input indicating that that a first activity/task of the system-derived composite activity sequence relates to sending an engagement letter to a client via email, that a second activity/task of the system-derived composite activity sequence relates to following-up with the client via email, that a third activity/task of the system-derived composite activity sequence relates to obtaining a signed engagement letter from the client via email, that a fourth activity/task of the system-derived composite activity sequence relates to scanning the signed engagement letter into a file/directory/storage location associated with the client, that a fifth activity/task of the system-derived composite activity sequence relates to reviewing the client's case file, and/or the like.

User-Derived Composite Activity Sequences

In a second implementation, embedding one or more composite activity sequences in the digital activity-accelerator registry may include embedding one or more user-derived (or user-created) composite activity sequences in the digital activity-accelerator registry. In one example of such implementations, S210 may function to construct the one or more user-derived composite activity sequences based on one or more inputs received by a user.

In some embodiments of such an example, S210 may function to collect the one or more user inputs by generating and displaying one or more one or more task-related prompts and/or task-related input objects via graphical user interfaces. The information that may be collected, via the one or more graphical user interfaces, may include, but may not be limited to, a user-provided name/label for the composite activity sequence being created (e.g., "New Client Intake"), a practice area associated with the composite activity sequence being created (e.g., "Intellectual Property"), a sub-practice area associated with the composite activity sequence being created (e.g., "Patents"), a list of user-performed or computer-executable task/actions that correspond to the composite activity sequence being created (e.g., sending an engagement letter, creating a new client matter in the subscriber's document management system, etc.), the order in which the list of tasks/actions are to be performed, and/or the like.

Furthermore, in some embodiments, the above-described graphical user interface(s) may additionally, or alternatively, include a user interface element that, when selected, causes S210 to create a composite activity sequence according to the provided inputs and/or cause the drafted composite activity sequence to be embedded in the digital activity-accelerator registry.

2.15 Converting Tasks of a Composite Activity Sequence to Computer-Executable Instructions Optionally, S215, which includes encoding a composite activity sequence with computer executable code, may function to convert tasks of a target composite activity sequence partially or completely to computer-executable instructions. In one or more embodiments, S215 may function to compute or define computer-executable instructions for a given task of a composite activity sequence and in one or more embodiments, encode a display element representing each respective tasks with a distinct computer-executable instructions that, when selected and executed, automatically performs the respective task.

As non-limiting examples, S210 may function to generate computer-executable instructions that, when selected and executed, generates a digital document (e.g., an engagement document), retrieves digital data and/or a digital file, composes content, auto populates a digital document, creates a new file (or client matter), and/or the like.

2.20 Computing Activity-Accelerating Inferences

S220, which includes computing activity-accelerating inferences, may function to compute activity-accelerating inferences for an identified (or sourced) user data artifact or user digital activity data. In a preferred embodiment, the one or more activity-accelerating inferences may be computed for a user data artifact comprising one or more digital messages received, drafted, and/or sent by a target user (e.g., text messages, email messages, instant messages, or the like), calendar appointment data related to the target user, and/or the like. In one or more embodiments, the one or more activity-accelerating inferences relate to a machine learning computed inference or prediction that identifies a likely activity classification or a likely intent classification of an activity being performed by a user for completing system- or service-recognized objective.

Accordingly, in some embodiments, computing activity-accelerating inferences may include establishing a secure connection to one or more digital accounts of the target user (e.g., messaging accounts, email accounts, calendar scheduling accounts, and/or the like) and, in turn, computing activity-accelerating inferences based on one or more digital artifacts existing in such digital accounts. In some examples, upon establishing a secure connection to one or more digital accounts of the target user, S220 may function to compute activity-accelerating inferences for each new user artifact detected in the one or more digital accounts (e.g., for each new received or sent email message, text message, calendar invitation, etc.). Alternatively, in another example, S220 may function to only compute activity-accelerating inferences for user artifacts that satisfy inference-generation criteria (e.g., only compute activity-accelerating inferences for new incoming (email) messages or after a collection or detection of activity satisfying a minimum activity threshold).

Ensemble of Subscriber-Specific Machine Learning Models

In one implementation, S220 may function to compute the activity-accelerating inferences via an ensemble of subscriber-specific machine learning models. Accordingly, in such an implementation, computing the activity-accelerating inferences may include extracting a plurality of features from a target user artifact and/or include providing those extracted plurality of features as input to the ensemble of subscriber-specific machine learning models. It shall be noted that, in some portions of the disclosure, a target user artifact may be referred to as a "target digital artifact," "a target artifact," or the like.

In some examples, the input provided to the ensemble of subscriber-specific machine learning models may comprise a composite vector (e.g., numerical) representation of a target user artifact. For instance, in a non-limiting example, if the target user artifact corresponds to a user email message, generating a composite vector representation of that email message may include computing a numerical representation of a subject of that email message; computing a numerical representation of a body of that email message; computing a numerical representation of a sender and/or recipient(s) of that email message; computing a numerical representation for one or more attachments included in that email message; aggregating/concatenating the one or more of the numerical representations into a single vector representation; and/or the like.

It shall be noted that composite vector representations for other types of user artifacts (e.g., calendar appointments, text messages, etc.) may be computed, by S220, in one or more similar ways described above.

Models Underpinning the Subscriber-Specific Machine Learning Ensemble

In some embodiments, the machine learning models included in the subscriber-specific machine learning ensemble may be based on one or more characteristics or attributes of the subscriber and/or may be trained using one or more corpora of training data samples extracted from digital activities performed by the subscriber. In one example, the subscriber-specific machine learning ensemble may be constructed based at least on training data derived from a domain or industry relating to the subscriber (e.g., a first attribute of the subscriber). For instance, in a non-limiting example, if the subscriber relates to a first industry/domain (e.g., legal domain), S220 may function to implement a machine learning ensemble that comprises a plurality of legal domain-specific machine learning models (e.g., a collection of machine learning models trained using corpora of data samples relating to the legal domain and the like). Conversely, if the subscriber relates to a second industry/domain (e.g., accounting domain), S220 may function to implement a machine learning ensemble that comprises a plurality of accounting domain-specific machine learning models.

Activity-Accelerating Inferences

The below will describe example machine learning models that may be included in a subscriber-specific machine learning ensemble. However, it shall be recognized that the below description is not intended to be limiting and that a subscriber-specific machine learning ensemble may implement more, fewer, or different machine learning models than the ones described below without departing from the scope of the invention(s) contemplated herein.

In a first implementation, a subscriber-specific machine learning model may implement one or more machine learning models specifically configured to estimate/predict an intent of a user based on a provided input (e.g., a composite vector representation of a user artifact). Accordingly, in such an implementation and based on S220 providing a vector representation of a target user artifact to the subscriber-specific machine learning ensemble as input, the one or more machine learning models may function to compute one or more activity-accelerating inferences relating to a prediction/estimation of a subsequent action to be performed by the user (e.g., predict/estimate the immediate next action of the user, such as draft a client-specific (legal) document, file a client-specific (legal) document, begin performing due-diligence activities, send an inquiry message to advising counsel, send a reply message to a sender associated with the user artifact, etc.).

It shall be noted that, in some embodiments, the intent-informative activity-accelerating inferences may additionally, or alternatively, indicate an urgency associated with the user artifact, payment preferences specified in the user artifact, outcomes desired by a sender associated with the user artifact, and/or the like.

In a second implementation, the subscriber-specific machine learning model may additionally, or alternatively, implement one or more machine learning models specifically configured to estimate/predict a practice area (e.g., domain) associated with a target user artifact. Accordingly, in such an implementation and based on S220 providing a vector representation of the target user artifact to the subscriber-specific machine learning ensemble as input, the one or more machine learning models may function to compute one or more activity-accelerating inferences relating to a prediction/estimation of a practice area associated with the target user artifact (e.g., intellectual property, bankruptcy law, corporate law, etc.).

In a third implementation, the subscriber-specific machine learning model may additionally, or alternatively, implement one or more machine learning models specifically configured to estimate/predict a sub-practice (e.g., sub-domain) relating to a target user artifact. Accordingly, in such an implementation and based on S220 providing a vector-based representation of the target user artifact to the subscriber-specific machine learning ensemble as input, the one or more machine learning models may function to compute one or more activity-accelerating inferences relating to a prediction/estimation of a sub-practice associated with the target user artifact (e.g., to which intellectual property sub-domain the user artifact relates: patents, trademarks, etc.).

In a fourth implementation, the subscriber-specific machine learning model may additionally, or alternatively, implement one or more machine learning models specifically configured to extract probative information from the target user artifact. For instance, in a non-limiting example, based on the subscriber-specific machine learning ensemble receiving a vector representation of a target user artifact, the one or more machine learning models may function to extract one or more types of entities named in the target user artifact (e.g., company name, company address, company phone number, client name, time expressions, locations, and/or the like).

2.30 Identifying Germane Activity-Accelerating Actions

S230, which includes identifying germane activity-accelerating actions, may function to identify activity-accelerating actions germane/relevant to a target user artifact based on the activity-accelerating inferences computed in S220 and the digital activity-accelerator registry constructed in S210. In a preferred embodiment, identifying activity-accelerating actions germane to a target user artifact (e.g., a user email message) may include identifying a target composite activity sequence in the digital activity-accelerator registry that corresponds to the target user artifact and/or may include which of the activities/tasks included in the target composite activity sequence are germane to the target piece of user data.

Composite Activity Sequence Storage Repository

In some embodiments, to identify which composite activity sequence in the digital activity-accelerator registry relates to the target user artifact, S230 may function to search one or more data structures, lookup tables, and/or databases that store distinct entries corresponding to each composite activity sequence stored in the digital activity-accelerator registry. In one example, each distinct entry may include attributes relating to the composite activity sequence that it corresponds to, such as the unique identifier assigned to such composite activity sequence, the name assigned to such composite activity sequence, the practice area assigned to such composite activity sequence, the sub-practice area assigned to such composite activity sequence, the activities/tasks comprising such composite activity sequence, and/or the like.

It shall be noted that, in some examples, the digital activity-accelerator registry (described in S210) may comprise the above-described data structures, lookup tables, and/or databases. Thus, in some examples, identifying relevant activity-accelerating actions may include searching the digital activity-accelerator registry in addition, or as an alternative, to querying/searching one or more other data storage modules/systems. Furthermore, it shall also be noted that, in some portions of the disclosure, the above-described data structures, lookup tables and/or databases may be referred to as "a composite activity sequence storage repository."

Constructing a Search Query

In some embodiments, S230 may function to construct a search query to search the composite activity sequence storage repository. In one example of such embodiments, constructing the search query may include (automatically) generating search criteria/parameters for the search query and annotating the search query to include such search criteria/parameters.

In some embodiments, automatically generating search parameters/criteria for a search query may include automatically generating a search criterion/parameter based on the activity-accelerating inference related to predicted user intent (computed in S220). In one embodiment, generating such a search criterion may include constructing an expression (e.g., Boolean expression) that causes the search query to search for composite activity sequences that include a task or action equivalent (or semantically similar) to the estimated/predicted intent of the user. For instance, in a non-limiting example, if S220 computed an activity-accelerating inference indicating that, based on a target user artifact, the immediate next action of the target user corresponds to "drafting a client engagement letter," S230 may function to construct a search criterion/parameter that causes the search query to only search for composite activity sequences that comprise a task/activity relating to "drafting a client engagement letter."

In some embodiments, automatically generating search criteria for a search query may additionally, or alternatively, include generating a search criterion based on the activity-accelerating inferences relating to the predicted/estimated practice area associated with a target user artifact (computed in S220). In one embodiment, generating such a search criterion may include constructing an expression (e.g., Boolean expression) that causes the search query to search for composite activity sequences—in the composite activity sequence storage repository—that only belong to the predicted/estimated practice area of a target user artifact. For instance, in a non-limiting example, if S220 computed an activity-accelerating inference indicating that a target piece of user data relates to the "Intellectual Property" practice area, S230 may function to construct a search criterion that causes the search query to only search for composite activity sequences that belong to the "Intellectual Property" practice area.

In some embodiments, automatically generating search criteria for a search query may additionally, or alternatively, include generating a search criterion based on the activity-accelerating inference relating to the predicted/estimated sub-practice area associated with a target user artifact (computed in S220). In one embodiment, generating such a search criterion may include constructing an expression (e.g., Boolean expression) that causes the search query to search for composite activity sequences—in the composite activity sequence storage repository—that belong to the predicted/estimated sub-practice area associated with the target user artifact. For instance, in a non-limiting example, if S220 computed an activity-accelerating inference indicating that a target user artifact relates to the "Patent" sub-practice area, S230 may function to construct a search criterion that causes the search query to only search for composite activity sequences that belong to the "Patent" sub-practice area.

In some embodiments, automatically generating search criteria for a search query may additionally, or alternatively, include generating one or more search criteria based on probative information extracted from the target user artifact (described in S220). In one embodiment, generating the one or more search criteria may include constructing one or more search expressions (e.g., Boolean expressions) that cause the search query to search for composite activity sequences—in the composite activity sequence storage repository—that have been created by the user associated with the target user artifact, that have been created by a business/organization (e.g., a business administrator) associated with the user, that corresponds to the client associated with the target user artifact, and/or the like.

Executing a Search Query

Figure 3:
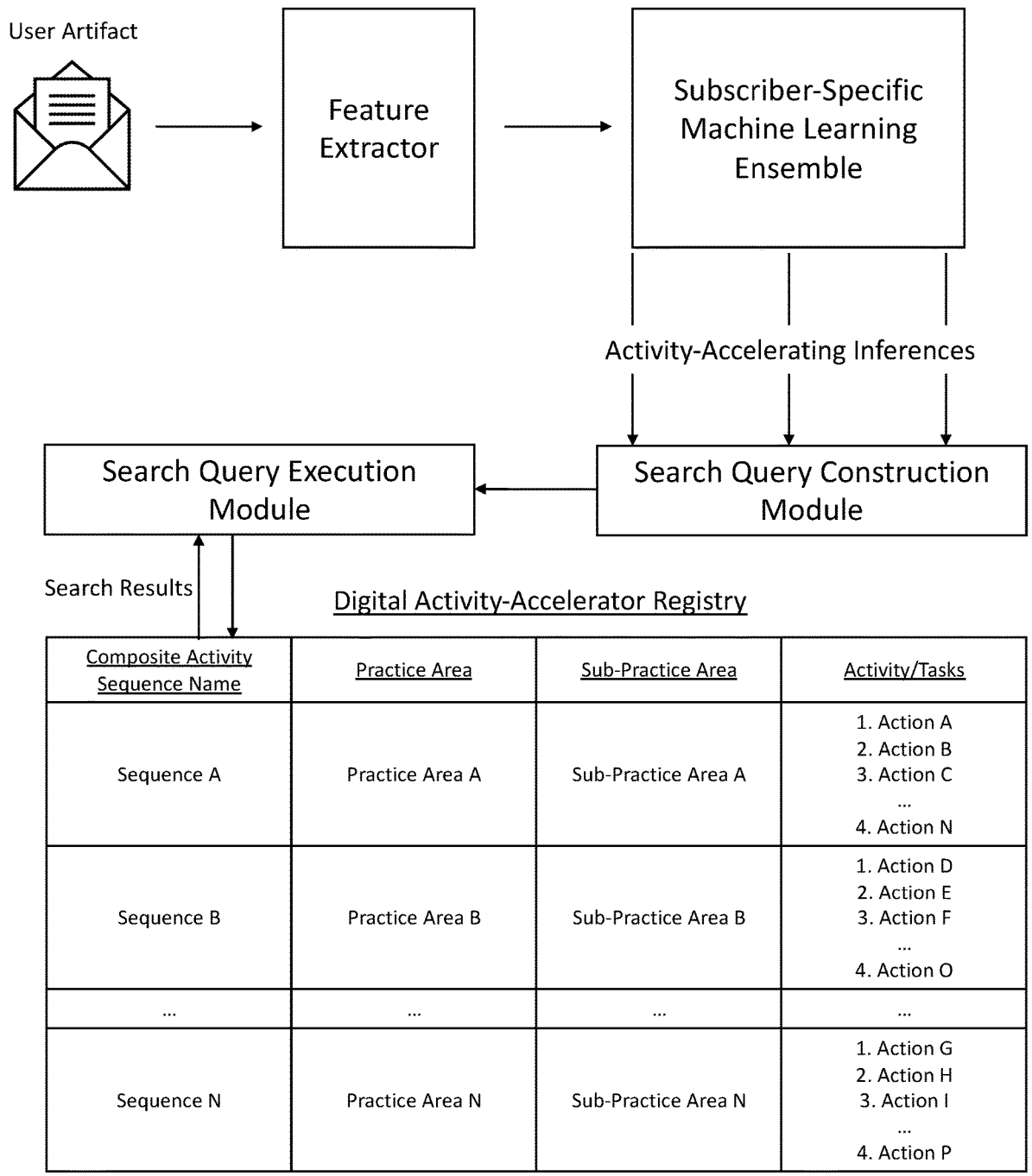
FIG. 3 illustrates an example schematic for searching a digital activity-accelerator registry in accordance with one or more embodiments of the present application.

Additionally, or alternatively, in some embodiments, as generally shown in FIG. 3, S230 may function to execute the constructed activity sequence search query. Executing the constructed search query (as briefly mentioned above) may cause S240 to search a composite activity sequence storage repository for one or more composite activity sequences that satisfy the search criteria/parameters of the search query. In some embodiments, if S230 finds a composite activity sequence satisfying the search criteria/parameters of the search query, S230 may, in turn, return that composite activity sequence as a search result. Otherwise, in some embodiments, if S230 does not find a composite activity sequence satisfying the search criteria/parameters of the search query, S230 may not return any composite activity sequence as result of executing the search query.

Accordingly, in some embodiments, the activity-accelerating actions that S230 determines to be germane to a target piece of user data may be based on results returned from executing the search query. For instance, in one example of such embodiments, based on a first composite activity sequence being returned from a search query, S230 may function to identify at least a subset of the actions/tasks included in the first composite activity sequence as being germane to the target user artifact.

In a preferred embodiment, the actions/tasks that S230 determines to be germane to the target user artifact may only include actions/tasks that match or relate to the estimated intent of the user and/or only include actions/tasks that may be executed after (e.g., subsequent to) the action/task matching the estimated intent of the user.

Furthermore, in some embodiments, in the event that no composite activity sequence is returned from the search query, S230 may function to determine that no composite activity sequence in the composite activity sequence storage repository is germane to the target piece of user data and thus, may identify zero actions/tasks as being germane to the target piece of user data (and thus, may cause the method 200 to forgo performing one or more processes described in S240).

2.40 Executing Germane Activity-Accelerating Actions

S240, which includes executing germane activity-accelerating actions, may function to automatically execute one or more of the activity-accelerating actions determined, in S230, to be germane to a target piece of user data.

In some embodiments, S240 may function to execute one or more activity-accelerating actions based on user input. In one example of such embodiments, to interface with a user, S240 may function to display a graphical user interface that includes one or more selectable representations corresponding to the one or more activity-accelerating actions determined, in S230, to be germane to a target piece of user data. Each selectable representation displayed in the graphical user interface, when selected, may cause S240 to execute (or initiate a process to execute) the activity-accelerating action corresponding to that selected representation (described in more detail below).

It shall be noted that, while the above embodiment(s) describe examples of executing activity-accelerating actions based on user input, S240 may additionally, or alternatively, function to automatically execute (e.g., without user input) one or more of the activity-accelerating actions determined, in S230, to be germane to a target user artifact. Furthermore, it shall also be noted that displaying germane activity-accelerating actions to a target user may result in many technical benefits including, but not limited, enabling knowledge transfer between different entities (e.g., employees) of an organization, promoting process/task consistency across employees of an organization, and/or the like.

Automatically Composing/Generating Documents

In some embodiments, executing a target activity-accelerating action may include automatically composing/generating one or more documents or emails. For instance, in a non-limiting example, if S240 is executing an activity-accelerating action corresponding to "draft a client engagement letter," S240 may function to automatically compose (generate) one or more documents and/or emails relating to drafting a client engagement letter.

In some embodiments, automatically composing/generating one or more documents or emails may include identifying one or more document-based and/or email-based templates corresponding to the activity-accelerating action being executed. In one example of such embodiments, S240 may function to identifying document-based and/or email-based templates corresponding to a target activity-acceleration action by querying one or more data structures, database tables and/or lookup tables that correlate activity-accelerating actions to a target set of document-based and/or email-based templates.

Accordingly, in such an example, S240 may function to search such storage repositories for an entry corresponding to the target activity-accelerating action and identify, based on that entry, document-based and/or email-based templates corresponding to the target activity-accelerating action.

In some embodiments, the document-based and/or email-based templates identified as corresponding to a target activity-accelerating action may include one or more in-line document tags that indicate, to S240, that these in-line document tags should be replaced based on the probative information extracted from the target user artifact in S220 and/or based on the activity-accelerating inferences computed for the target user artifact in S220. For instance, in a non-limiting example, the one or more document-based and/or email-based templates corresponding to the target activity-accelerating action may include one or more first in-line document tags that indicate S240 should replace theses with the name of the company associated with the target user artifact (e.g., {company_name}), may include one or more second in-line document tags that indicate S240 should replace these tags with the client matter number associated with the target user artifact (e.g., {client_matter_number}).

Additionally, or alternatively, in some embodiments, automatically composing/generating one or more documents or emails may include installing at locations corresponding to the in-line document tags data based on the probative information extracted from the target user artifact in S220 and/or based on the activity-accelerating inferences computed for the target user artifact in S220. For instance, in a non-limiting example, if S220 extracted that the target user artifact is associated with client matter number 1027-50006.01 and associated with with company 'XYZ', S240 may function to replace each in-line document tag corresponding to "{company_name}" and "{client_matter_number}" with the text 'XYZ' and '1027-50006.01'; respectively.

Improving Activity-Accelerating Recommendations

In some embodiments, S240 may additionally, or alternatively, function to continuously adapt, modify, or improve the activity-accelerating actions it recommends to a user based on observed behavior and/or preferences of that user. For instance, in a non-limiting example, if a user decides to forgo executing one of the recommended activity-accelerating actions (or provides an indication that they wish to manually perform such action), S240 may function to de-prioritize that activity-accelerating action when generating future activity-accelerating recommendations for that user (and/or that type of target user artifact). Conversely, if a user decides to execute one of the recommended activity-accelerating actions, S240 may function to prioritize that activity-accelerating action when generating future activity-accelerating recommendations for that user (and/or that type of target user artifact).

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for machine learning-informed surfacing and automated execution of digital activity-accelerating actions, the method comprising:
constructing a digital activity-accelerator registry that includes a plurality of composite activity sequences, wherein each of the plurality of composite activity sequences relates to a distinct collection of interdependent computer-executable tasks;
identifying a target digital artifact; and
based on identifying the target digital artifact:
computing, by one or more computers operating an ensemble of machine learning models, a plurality of activity-accelerating inferences for the target digital artifact, including:
(1) a first activity-accelerating inference that relates to an estimated intent of the target digital artifact,
(2) a second activity-accelerating inference that relates to an estimated domain of an activity associated with the target digital artifact, and
(3) a third activity-accelerating inference that relates to an estimated sub-domain of the activity associated with the target digital artifact;
searching the digital activity-accelerator registry based on the plurality of activity-accelerating inferences, wherein searching the digital activity-accelerator registry includes:
constructing a composite activity sequence search query that comprises a plurality of search parameters, wherein the plurality of search parameters includes:
(A) a first search parameter that causes the search query, when executed, to search for composite activity sequences in the digital activity-accelerator registry that include a computer-executable task relating to the estimated intent of the target digital artifact,
(B) a second search parameter that causes the search query, when executed, to search for composite activity sequences in the digital activity-accelerator registry that relate to the estimated domain of the activity associated with the target digital artifact, and
(C) a third search parameter that causes the search query, when executed, to search for composite activity sequences in the digital activity-accelerator registry that relate to the estimated sub-domain of the activity associated with the target user artifact; and
executing the composite activity sequence search query, wherein executing the composite activity sequence causes one or more target composite activity sequences to be returned from the digital activity-accelerator registry if the one or more target composite activity sequences satisfy the plurality of search parameters;
extracting at least a subset of the computer-executable tasks included in the one or more target composite activity sequences based on one or more pre-defined action-surfacing criteria; and
displaying, via a graphical user interface, a digital representation corresponding to each computer-executable task included in the subset, wherein each digital representation displayed in the graphical user interface is selectable and, when selected, causes a corresponding activity-accelerating task to be automatically executed by the one or more computers.

2. The method of claim 1, wherein constructing the digital activity-accelerator registry includes automatically creating, by the one or more computers, the plurality of composite activity sequences.

3. The method of claim 2, wherein automatically creating the plurality of composite activity sequences includes:
collecting digital activity data relating to one or more users over a respective period of time,
grouping the digital activity data into one or more sets of interdependent computer-executable tasks,
instantiating a composite activity sequence corresponding to each of the one or more sets of interdependent computer-executable tasks, and
embedding each instantiated composite activity sequence in the digital activity-accelerator registry.

4. The method of claim 3, wherein
the digital activity data includes a first plurality of computer-executable tasks, and
grouping the digital activity data into the one or more sets of interdependent computer-executable tasks includes:
in accordance with a determination that the one or more users performed the first plurality of computer-executable tasks in a same order for more than a threshold number of times, grouping the first plurality of computer-executable tasks as a first set of interdependent computer-executable tasks; and
in accordance with a determination that the one or more users did not perform the first plurality of computer-executable tasks in a same order for more than the threshold number of times, forgoing grouping the first plurality of computer-executable tasks.

5. The method of claim 1, wherein the digital activity-accelerator registry includes (1) a plurality of composite activity sequences automatically derived by the one or more computers and (2) a plurality of user-created composite activity sequences.

6. The method of claim 1, wherein:
the one or more target composite activity sequences returned from executing the composite activity sequence search query includes a first target composite activity sequence, and
extracting the subset of computer-executable tasks from the first target composite activity sequence includes:
(1) extracting, from the first target composite activity sequence, a first computer-executable task corresponding to the estimated intent of the target digital artifact, and
(2) extracting, from the first target composite activity sequence, one or more second computer-executable tasks ordered after the computer-executable task corresponding to the estimated intent of the target digital artifact.

7. The method of claim 6, wherein computer-executable tasks ordered before the first computer-executable task are not extracted from the first target composite activity sequence.

8. The method of claim 1, wherein the one or more target composite activity sequences satisfy the plurality of search parameters if:
(1) the one or more target composite activity sequences include a computer-executable task relating to the estimated intent of the target digital artifact,
(2) the one or more target composite activity sequences relate to the estimated domain of the activity associated with the target digital artifact, and (3) the one or more target composite activity sequences relate to the estimated sub-domain of the activity associated with the target digital artifact.

9. The method of claim 1, wherein:
the method is performed at a computer-aided task automation service, and
the target digital artifact comprises a digital email message.

10. The method of claim 9, wherein the target digital artifact is identified within a threshold amount of time of a digital messaging application sending the digital email message.

11. The method of claim 9, wherein the target digital artifact is identified within a threshold amount of time of a digital messaging application receiving the digital email message.

12. The method of claim 1, wherein displaying the graphical user interface includes displaying the digital representation corresponding to each computer-executable task included in the subset concurrently with a digital representation of the target digital artifact.

13. The method of claim 1, wherein the graphical user interface includes a first digital representation corresponding to a first computer-executable task, the method further comprising:
receiving an input selecting the first digital representation; and
based on receiving the input:
searching a lookup table that correlates computer-executable tasks to document templates; and
in accordance with a determination that the lookup table includes an entry corresponding to the first computer-executable task, automatically generating one or more user-specific documents.

14. The method of claim 13, further comprising:
in accordance with a determination that the lookup table does not include the entry corresponding to the first computer-executable task, forgoing automatically generating one or more user-specific documents.

15. The method of claim 13, wherein automatically generating one or more user-specific documents includes:
identifying, based on the entry corresponding to the first computer-executable task, a plurality of document templates corresponding to the first computer-executable task;
instantiating, based on the plurality of document templates, a plurality of user-specific documents;
extracting, via an entity extraction machine learning model, a plurality of named entities from the target digital artifact; and
installing, at corresponding portions in the plurality of user-specific documents, one or more of the plurality of named entities.

\* \* \* \* \*